United States Patent
Gong

(10) Patent No.: US 6,222,347 B1
(45) Date of Patent: *Apr. 24, 2001

(54) SYSTEM FOR CHARGING PORTABLE COMPUTER'S BATTERY USING BOTH THE DYNAMICALLY DETERMINED POWER AVAILABLE BASED ON POWER CONSUMED BY SUB-SYSTEM DEVICES AND POWER LIMITS FROM THE BATTERY

(75) Inventor: Andrew Gong, San Mateo, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/070,489

(22) Filed: Apr. 30, 1998

(51) Int. Cl.[7] .................................................. H02J 7/00
(52) U.S. Cl. ......................... 320/137; 320/134; 320/164
(58) Field of Search .................................. 324/427, 426; 320/125, 134, 128, 162, 160, 137, 164; 307/66; 713/340, 321

(56) References Cited

U.S. PATENT DOCUMENTS

| | | | |
|---|---|---|---|
| 5,239,495 | * 8/1993 | Nanno et al. ......................... | 713/321 |
| 5,581,772 | * 12/1996 | Nanno et al. ......................... | 713/340 |
| 5,596,260 | 1/1997 | Moravec et al. ..................... | 320/135 |
| 5,608,324 | * 3/1997 | Yoshida ................................ | 324/426 |
| 5,622,789 | 4/1997 | Young .................................. | 429/7 |
| 5,625,275 | * 4/1997 | Tanikawa et al. .................... | 320/160 |
| 5,645,949 | 7/1997 | Young .................................. | 429/7 |
| 5,666,006 | 9/1997 | Townsley et al. ..................... | 307/66 |
| 5,744,963 | * 4/1998 | Arai et al. ............................ | 324/427 |
| 5,773,963 | 6/1998 | Blanc et al. ......................... | 320/145 |
| 5,847,543 | * 12/1998 | Carroll ................................. | 320/125 |
| 5,939,862 | * 8/1999 | Kates et al. ........................... | 320/125 |
| 5,963,015 | * 10/1999 | Lee ..................................... | 320/128 |
| 5,986,437 | * 11/1999 | Lee ..................................... | 320/162 |
| 5,998,972 | * 12/1999 | Gong ................................... | 320/134 |

* cited by examiner

Primary Examiner—Meng-Al T. An
Assistant Examiner—Jungwon Chang
(74) Attorney, Agent, or Firm—Beyer, Weaver & Thomas, LLP

(57) ABSTRACT

Improved techniques for charging batteries within portable computing devices are disclosed. The improved techniques operate to charge a battery at dynamically determined power levels. The power levels for charging the battery are dynamically determined by monitoring the power consumption of the portable computing device. When subsystems of the portable computing device are determining to be consuming less power than has been allocated thereto, higher levels of power from a power source are made available for charging the battery. As a result, the battery is able to be charged at a rate that is significantly faster than previously performed. Also, by dynamically monitoring the power consumption of the portable computing device, the improved techniques also ensure that the portable computing device will not be starved for power during its operation even as its subsystem's switch between normal (active) modes and low power modes.

19 Claims, 9 Drawing Sheets

SYSTEM FOR CHARGING PORTABLE COMPUTER'S BATTERY USING BOTH THE DYNAMICALLY DETERMINED POWER AVAILABLE BASED ON POWER CONSUMED BY SUB-SYSTEM DEVICES AND POWER LIMITS FROM THE BATTERY

CROSS REFERENCE TO RELATED APPLICATION

This application is related to U.S. application Ser. No. 09/070,495, entitled "METHOD AND APPARATUS FOR RAPIDLY CHARGING A BATTERY OF A PORTABLE COMPUTING DEVICE, filed on even date herewith, now U.S. Pat. No. 5,998,972 and hereby incorporated by reference.

BACKGROUND OF THE INVENTION

1. Field of the Invention

The present invention relates to portable computing devices and, more particularly, to charging batteries of portable computing devices.

2. Description of the Related Art

A computing device often includes one or more batteries to supply power to the computing device. Those computing devices that use batteries to supply power to operate are referred to as portable computing devices. Portable computing devices pertain to a wide range of devices, including portable computers (various sizes), portable game apparatuses, personal digital assistants (PDAs), etc.

Normally, these portable computing devices use rechargeable batteries as the primary source of power to the device. The portable computing devices typically are also able to couple to an alternating current (AC) power source with an AC adapter. The AC adapter plugs into a electric wall socket and converts incoming AC power into DC power which is used to power the portable computing device and/or charge the rechargeable batteries within the portable computing device.

Conventionally, these batteries take a considerable amount of time to fully charge. One reason is that the amount of power made available for charging is determined based on a worst case power budget such that the power used to charge a battery tends to be low. As such, the power used to charge the battery is low when the portable computing device is active. Another reason why conventional charging is so slow is that the amount of power varies over the charging cycle as the battery voltage changes but the charging current remain fixed at a safe level. With this approach, the fixed current level is set to a rather low level so that when the portable computing device is active it will not be starved for power by the charging of the battery. If the portable computing device were to be starved for power during its operation, then the portable computing device would fail, crash or otherwise cease to operate.

Thus, there is a need for charging techniques that are able to better utilize available power to charge batteries.

SUMMARY OF THE INVENTION

Broadly speaking, the invention relates to improved techniques for charging batteries within portable computing devices. The improved techniques operate to charge a battery at dynamically determined power levels. The power levels for charging the battery are dynamically determined by monitoring the power consumption of the portable computing device. When subsystems of the portable computing device are determining to be consuming less power than has been allocated thereto, higher levels of power from a power source are made available for charging the battery. As a result, the battery is able to be charged at a rate that is significantly faster than previously performed. Also, by dynamically monitoring the power consumption of the portable computing device, the improved techniques also ensure that the portable computing device will not be starved for power during its operation even as its subsystem's switch between normal (active) modes and low power modes.

The invention can be implemented in numerous ways, including as a method, an apparatus, and a computer system. Several embodiments of the invention are discussed below.

As a method for charging a battery of a portable computing device from a power supply, one embodiment of the invention includes the acts of: determining an amount of power available for charging the battery from the power supply depending on power being consumed by subsystems of the portable computing device; and charging the battery in accordance with the determined amount of power, such that the battery is charged with an increased amount of power from the power supply when one or more of the subsystems of the portable computing device are in a low power mode.

As a method for charging a battery of a portable computing device having peripheral subsystems, another embodiment of the invention includes the acts of: periodically monitoring a state of the peripheral subsystems, the state including an active state and an inactive state; periodically determining a power available amount for charging the battery based on the state of the peripheral subsystems; and charging the battery in accordance with the power available amount.

As a computer system, still another embodiment of the invention includes: a power supply for providing DC power to the computer system from an AC power source; a battery for providing DC power to the computer system; a plurality of peripheral subsystems, each of the peripheral subsystems having a low-power state and an active state; a processor for performing computations and controlling the system; a power management unit for monitoring status of the battery, monitoring the state of the peripheral subsystems, and determining an amount of power available for charging based at least in part on those of the peripheral subsystems that are in the inactive state; and a battery charge circuit for delivering power from the power supply to the battery in accordance with the power charge level.

The advantages of the invention are numerous. One advantage of the invention is that a battery are able to be charged significantly faster than previously. Another advantage of the invention is that the charging of the battery is safely performed regardless of the amount of power being consumed by the operation of the portable computing device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for charging batteries within portable computing devices. The improved techniques operate to charge a battery at dynamically determined power levels. The power levels for charging the battery are dynamically determined by monitoring the power consumption of the portable computing device. When subsystems of the portable computing device are determining to be consuming less power than has been allocated thereto, higher levels of power from a power source are made available for charging the battery. As a result, the battery is able to be charged at a rate that is significantly faster than previously performed. Also, by dynamically monitoring the power consumption of the portable computing device, the improved techniques also ensure that the portable computing device will not be starved for power during its operation even as its subsystem's switch between normal (active) modes and low power modes.

The invention can operate to maximize (or at least increase) the power available for charging a battery within a computing device. To obtain the maximized power available for charging, the computing device can continuously monitor its subsystems and configuration to determine the actual power being utilized by the computing device. Once the actual power being consumed by the computing device is known, the remaining power that is available from a power supply is available for charging the battery. In one embodiment, the power consumed by the computing device is assumed to be equal to a worse case power budget in which the computer is assumed to be consuming its maximum power for operation. Hence, when the actual power dynamically used by the computing device is less than this worse case power budget, an extra amount of power is available for charging because it is not being consumed to operate the computing device.

With the dynamic monitoring and determination of the power being utilized by the computing device according to the invention, the power made available for charging batteries is significantly increased over conventional approaches such that batteries are able to be charged in rapid and efficient manner.

Embodiments of the invention are discussed below w ith reference to FIGS. 1–6. However, those skilled in the art will readily appreciate that the detailed description given herein with respect to these figures is for explanatory purposes as the invention extends beyond these limited embodiments.

Figure 1:
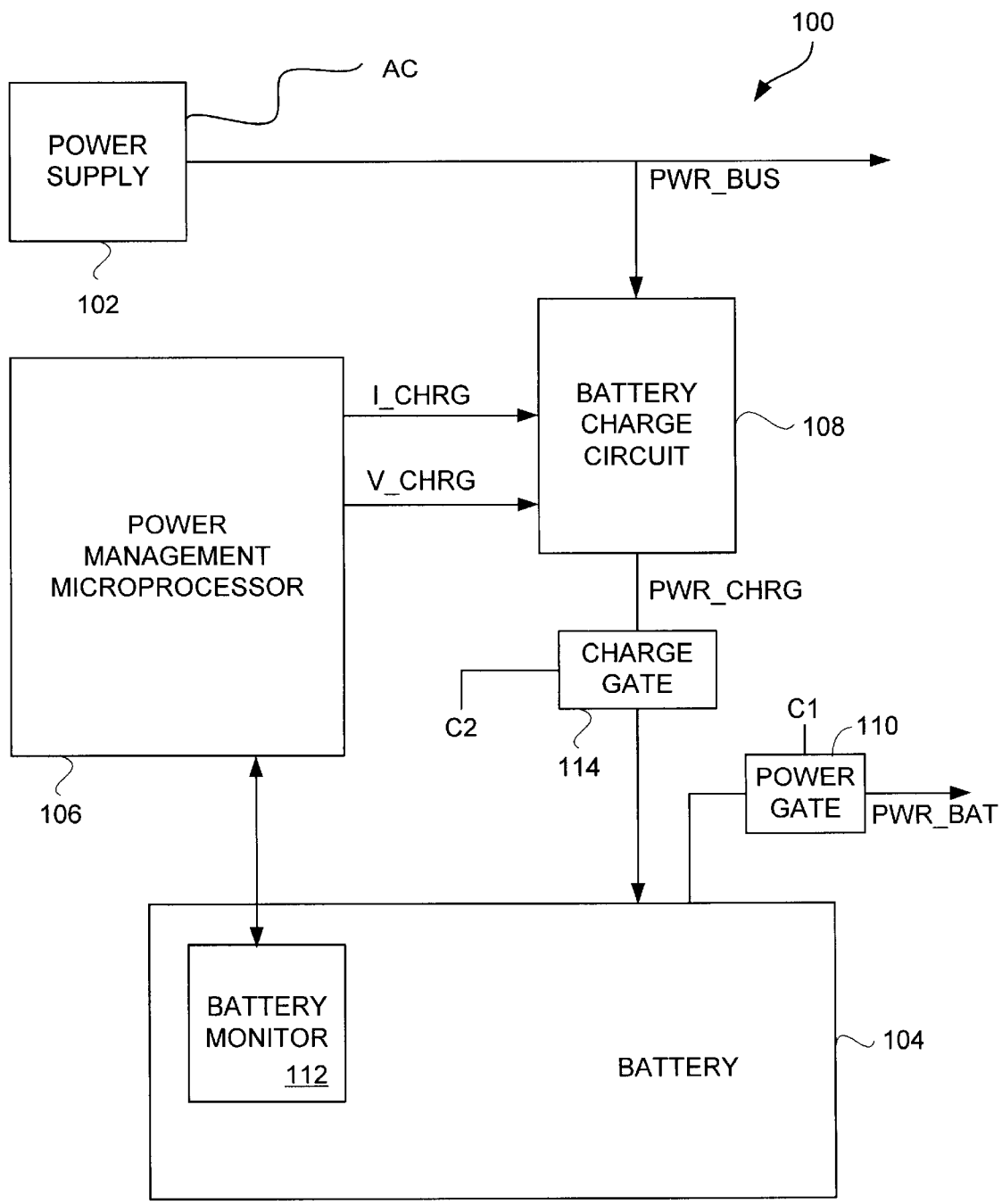
FIG. 1 is a block diagram of a portion of a portable computing device according to an embodiment of the invention.

FIG. 1 is a block diagram of a portion 100 of a portable computing device according to an embodiment of the invention. The portion 100 of the portable computing device is concerned with the supply of power to the portable computing device either through a power supply unit or a battery.

In particular, the portion 100 of the portable computing device includes a powersupply 102 and a battery 104. The power supply 102 connects to an alternating current (AC) source that serves as a source of power. The battery 104 serves as an alternative source of power. As is common in a portable computing device, the portable computing device can be supplied with power from either the power supply 102 or the battery 104. In other words, if the power supply 102 is able to be coupled to the AC source, then the power supply 102 can supply power to the portable computing device, namely a data processing and storage apparatus associated with the portable computing device. On the other hand, when the power supply 102 is not able to be connected to the AC source, then the battery 104, if charged, can supply power to the portable computing device.

The portion i00 of the portable computing device also includes a power management microprocessor 106 that manages the power consumption of the portable computing device. For example, the power management microprocessor 106 can perform various power saving features utilized with existing portable computing devices. Examples of such power saving features include: directing the system to a low-power state, dimming a display screen, or removing power from various subsystems of the portable computing device.

Additionally, according to the invention, the power management microprocessor 106 is used to control charging of the battery 104. Specifically, the power management microprocessor 106 couples to a battery charged circuit 108 in order to control the charging of the battery 104 of the portable computing device. The battery 104 is coupled to the processing apparatus by a power gate 110. The power gate 110 is controlled by a control signal (C1) and supplies power to the processing and storage apparatus via a battery power bus (PWR_BAT) when the power gate 110 is closed. Otherwise, when the power gate 110 is open, the battery 104 is not able t o supply power to the processing and storage apparatus. The control signal (C1) can be provided by a variety of sources, for example, the power management microprocessor 106.

In one implementation, the battery 104 is a "smart battery" that is able to monitor its own condition. More particularly, the battery 104 includes a battery monitor 112 that monitors the condition of the battery 104 and supplies digital signals to other components of the computer system that are interested in monitoring the conditions of the battery 104. In the embodiment illustrated in FIG. 1, the battery monitor 112 forwards a charge request and status information to the power management microprocessor 106 . The charge request, for example, includes a maximum charge current and a maximum charge voltage that the battery 104 desires to receive for the purpose of charging the battery 104. Typically, these maximum values are associated with the chemical composition of the battery 104 and thus can vary from battery to battery. The status information, for example, includes battery voltage, battery temperature, and capacity (e.g., percentage charged or discharged). In any event, the power management microprocessor 106 receives the charge request and the status information from the battery monitor 112, and then processes the information to determine a suitable charge current (I_CHRG) and a charge voltage (V_CHRG).

The battery charge circuit 108 is coupled to a po we r bus (PWR_BUS) and a power charge bus (PWR_CHRG). The power charge bus (PWR_CHRG) carries the power to the battery 104 in order to charge the battery 104. The power charge bus (PWR_CHRG) is coupled to the battery 104 through a charge gate 114. The charge gate 114 is controlled by a control signal (C2). When the charge gate 114 is closed, the power charge bus (PWR_CHRG) is coupled to the battery 104 and thus the battery 104 is able to be charged. On the other hand, when the charge gate 114 is open, the power charge bus (PWR_CHRG) is isolated from the battery 104 and thus does not charge the battery 104. The control signal (C2) can be provided by a variety of sources, for example, the power management microprocessor 106.

The battery charge circuit 108 determines an appropriate amount of power to supply to the battery 104 over the power charge bus (PWR_CHRG). The battery charge circuit 108 regulates the appropriate amount of power supplied to the battery 104 using the charge current (I_CHRG) and the charge voltage (V_CHRG). In one implementation, the appropriate amount of power to supply to the battery 104 is controlled by controlling the charge current (I_CHRG) such that the product of the charge current (I_CHRG) and the voltage of the battery (part of the status information from the battery monitor 112) remains nearly constant during the charging operation. Accordingly, during charging, as the voltage of the battery increases, the charge current (I_CHRG) is reduced so as to continue to supply an approximately constant amount of power to the battery.

Figure 2:
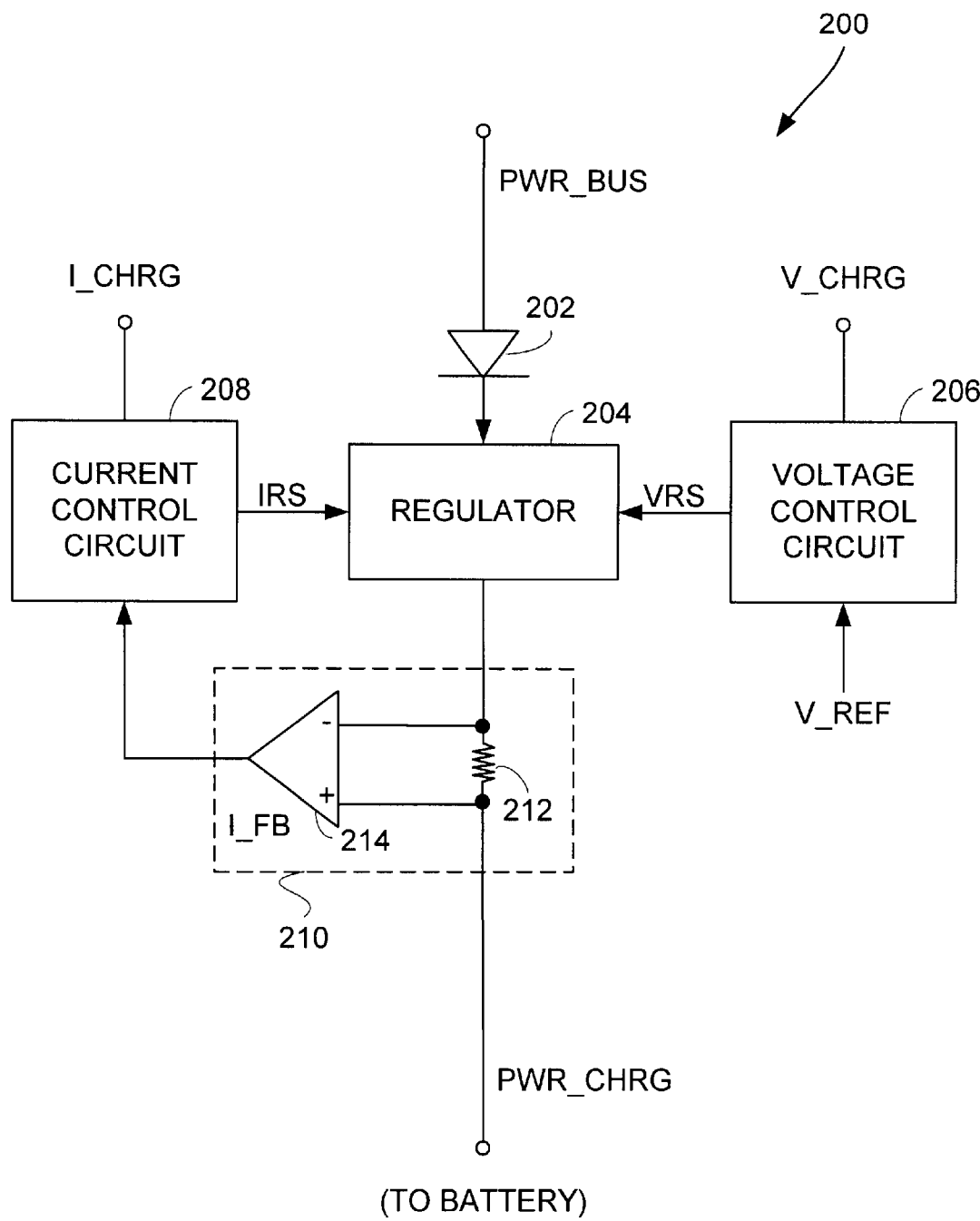
FIG. 2 is a schematic diagram of a battery charge circuit according to an embodiment of the invention.

FIG. 2 is a schematic diagram of a battery charge circuit 200 according to an embodiment of the invention. The battery charge circuit 200 is, for example, suitable for use as the battery charge circuit 108.

The battery charge circuit 200 includes a diode 202, a regulator 204, a voltage control circuit 206, a current control circuit 208, and a feedback circuit 210. The diode 202 serves to couple the power bus (PWR_BUS) to the regulator 204 so as to supply power from the power bus (PWR_BUS) to the regulator 204. The regulator 204 limits the amount of power that is drawn from the power bus (PWR_BUS) such that excessive amounts of power are not drawn from the power supply 102 that would cause the system to fail or otherwise crash. The voltage control circuit 206 and the current control circuit 208 operate to assist the regulator 204 in controlling the power that is drawn from the power supply and supplied to the power charge bus (PWR_CHRG).

In the case where the battery charge circuit 200 is used as the battery charge circuit 108, the voltage control circuit 206 and the current control circuit 208 are controlled by the power management microprocessor 106. The voltage control circuit 206 receives the charge voltage signal (V_CHRG) from the power management microprocessor 106 as well as a voltage reference signal (V_REF). Using these signals, the voltage control circuit 206 sends a voltage regulation signal (VRS) to the regulator 204. The voltage regulation signal (VRS) signals the regulator 204 in a manner such that the regulator 204 understands the difference between the charge voltage (V_CHRG) and the reference voltage (V_REF).

The current control circuit 208 receives a current charge signal (I_CHRG) from the power management microprocessor 106 and receives a feedback signal (I_FB) from the feedback circuit 210. The current control circuit 208 uses the charge current signal (I_CHRG) and the feedback signal (I_FB) to supply a current regulation signal (IRS) to the regulator 204. The current regulation signal (IRS) infor ms the regulator 204 of the difference between the charge current (I_CHRG) and th e feedback signal (I_FB).

In one embodiment, the feedback circuit 210 includes a resistor 212 an d a differential amplifier 214. The resistor 212 is placed in series between the regulator 204 and the power charge bus (PWR_CHRG). The two input terminals of the differential amplifier 214 are coupled to opposite sides of the resistor 212. Then, the voltage drop across the resistor 212 is input to the differential amplifier 214 to produce the feedback signal (I_FB). The feedback signal (I_FB) serves as some indication of the current (i.e., charge current) flowing from the regulator 204 to the power charge bus (PWR_CHRG) and then to the battery 104.

Figure 3A:
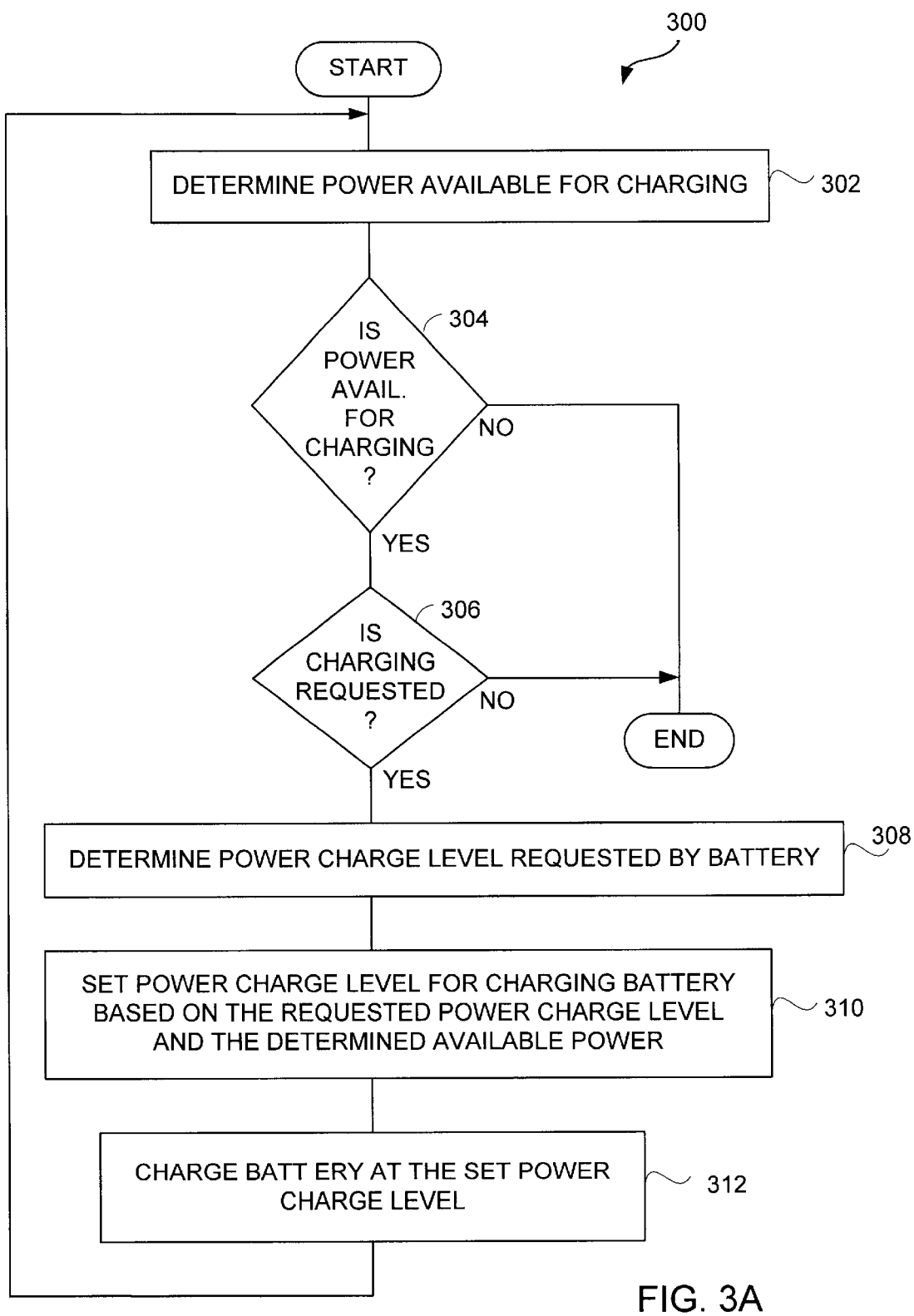
FIG. 3A is a flow diagram of battery charge processing according to an embodiment of the invention.

FIG. 3A is a flow diagram of battery charge processing 300 according to an embodiment of the invention. The battery charge processing 300 is used to charge a battery associated with a portable computing device. The battery charge processing 300 is, for example , performed by the portion 100 of the portable computing device illustrated in FIG. 1, namely, the power management microprocessor 106 and the battery charge circuit 108.

The battery charge processing 300 initially determines 302 power available for charging a battery. A power supply can supply only up to some maximum amount of power to the portable computing device. Unless improperly designed, the power supply can supply a sufficient amount of power not only for charging purposes but also for supplying power to the various active subsystems (or major components) of the portable computing device. The subsystems are those portions of the portable computing device that consume a relatively significant percentage of the overall power consumed by the portable computing device, but would not include a main processing system (e.g., microprocessor). The reason that the main processing apparatus is not included is that when the main processing apparatus is inactive (i.e., in a low-power state), the whole portable computing device (including most if not all of its subsystems) is deemed in a standby or low-power state. Examples of subsystems of the portable computing device include display screen system, storage drive system, external communication system (e.g., modem), and the like. Such subsystems can also be referred to as peripheral subsystems. Hence, the determination 302 of the available power depends on the power being consumed by the various active subsystems of the portable computing device. Given that the components of a portable computing device are activated and deactivated often, the power available for charging changes frequently. Accordingly, the battery charge processing 300 operates to periodically (e.g., dynamically) determine the available power for charging so that effective use can be made of power that is not otherwise needed to power the portable computing device.

After the power available for charging is determined 302, a decision block 304 determines whether there is any (or at least a minimum amount) of power available for charging a battery. When the decision block 302 determines that there is no power available (or less than a minimum amount of power available) for charging, then the battery charge processing 300 is complete and ends.

On the other hand, when the decision block 304 determines that there is power available for charging, a decision block 306 determines whether charging is requested. The decision block 306, for example, determines whether charging is requested by the battery 104. In this example, the battery 104 is a "smart battery" that can itself can request charging or otherwise indicate that charging is needed. Thus, when the decision block 306 determines that charging is not requested, the battery charge processing 300 is complete and ends.

Alternatively, when the decision block 306 determines that charging is requested, then the battery charge processing 300 continues. Namely, a power charge level being requested by the battery is determined 308. Next, a power charge level for charging the battery is set 310 based on the requested power charge level and the determined available power level. Thereafter, the battery is charged 312 at the set power charge level. Following block 312, the battery charge processing 300 returns to repeat the decision block 302 and subsequent blocks so that the power charge processing 300 is able to periodically update the power charge level by which the battery is charged. For example, the power charge level for charging the battery can be increased or decreased periodically due to changes in the available power for charging and/or battery conditions.

Figure 3B:
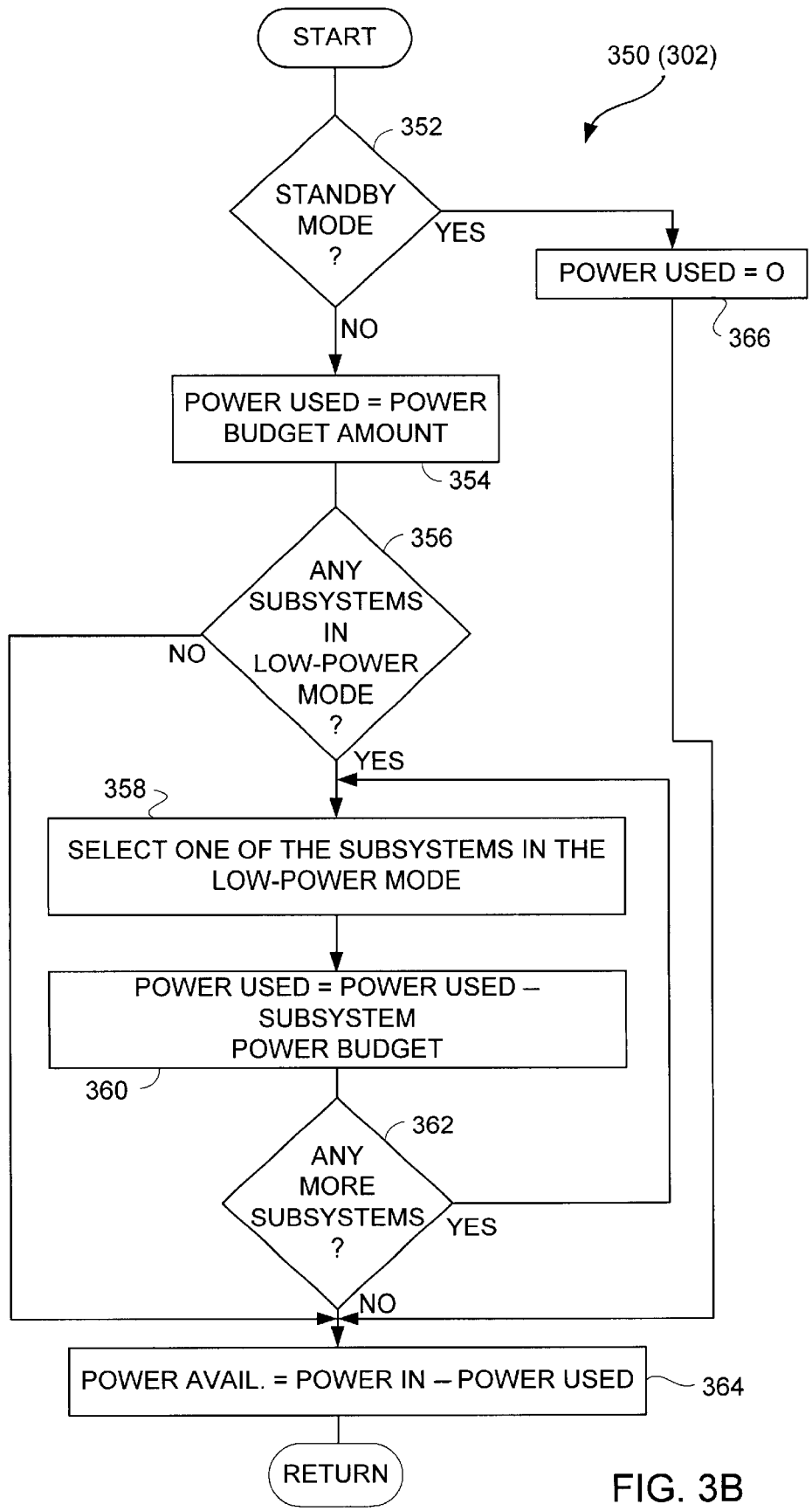
FIG. 3B is a flow diagram of power availability processing according to an embodiment of the invention.

FIG. 3B is a flow diagram of power availability processing 350. As an example, the power availability processing 350 represents the processing performed in block 302 in FIG. 3A according to one embodiment of the invention.

The power availability processing 350 begins with a decision block 352. The decision block 352 determines whether the computing device is in a standby mode. For example, in the case of a computer system, the standby mode is associated with a sleep mode or power down mode. Either of these types of modes is referred to as low powered modes.

When the computing device is active (i.e., not in the standby mode), the decision block 352 directs the power availability processing 350 to continue in an attempt to identify additional power that might be available for use in charging the battery. In block 354, a power use variable is set equal to a power budget amount. The power budget amount is predetermined for the computing device and represents the worst case amount of power that the computing device will consume during its active operation. Next, a decision block 356 determines whether or not there are any subsystems of the computing device that are in a low-power mode. When there are subsystems in the low-power mode, one of the subsystems in the low-power mode is selected 358. Then, the power used variable is reduced by the power budget associated with the selected subsystem (i.e., subsystem power budget).

Next, a decision block 362 determines whether there are more subsystems of the computing device to be processed. When the decision block 362 determines that there are additional subsystems to be processed, then the processing returns to repeat blocks 358–360 for each such subsystem. Thereafter, when the decision block 362 determines that there are no more subsystems to be processed, the power availability processing 350 determines the power available for charging in block 364. In particular, the power available for charging is determined by obtaining a power in amount provided by a power source (e.g., power supply 102) and subtracting the power used by the computing device. Following block 364, the power availability processing 350 is complete and returns.

Here, the power availability processing 350 has reduced the power used by the computing device to the extent possible by taking into consideration those of the subsystems of the computing device that are using less power than the worst case power budget assumes. As a result, the power used by the computing device is more accurately determined such that additional power often becomes available for charging the battery.

On the other hand, when the decision block 356 determines that there are no subsystems of the computing device that are in a low-power mode, the power availability processing 350 operates to bypass blocks 358–362. In this case, the power available for charging determined in block 364 is not improved because the computing device is fully active and is utilizing its worst case power budget.

Further, when the decision block 352 determines that the computing device is in the standby mode, the power availability processing 350 operates differently. In particular, in block 366, the power used by the computing device is set to zero (0) because in this situation the computing device (i.e., microprocessor and most or all subsystems) is in a low-power state and thus presumably consumes only minimal amounts of power. Following block 366, the power availability processing 350 jumps to block 364 where the power availability for charging is determined. Following block 364, the power availability processing 350 is complete and ends.

Figure 4:
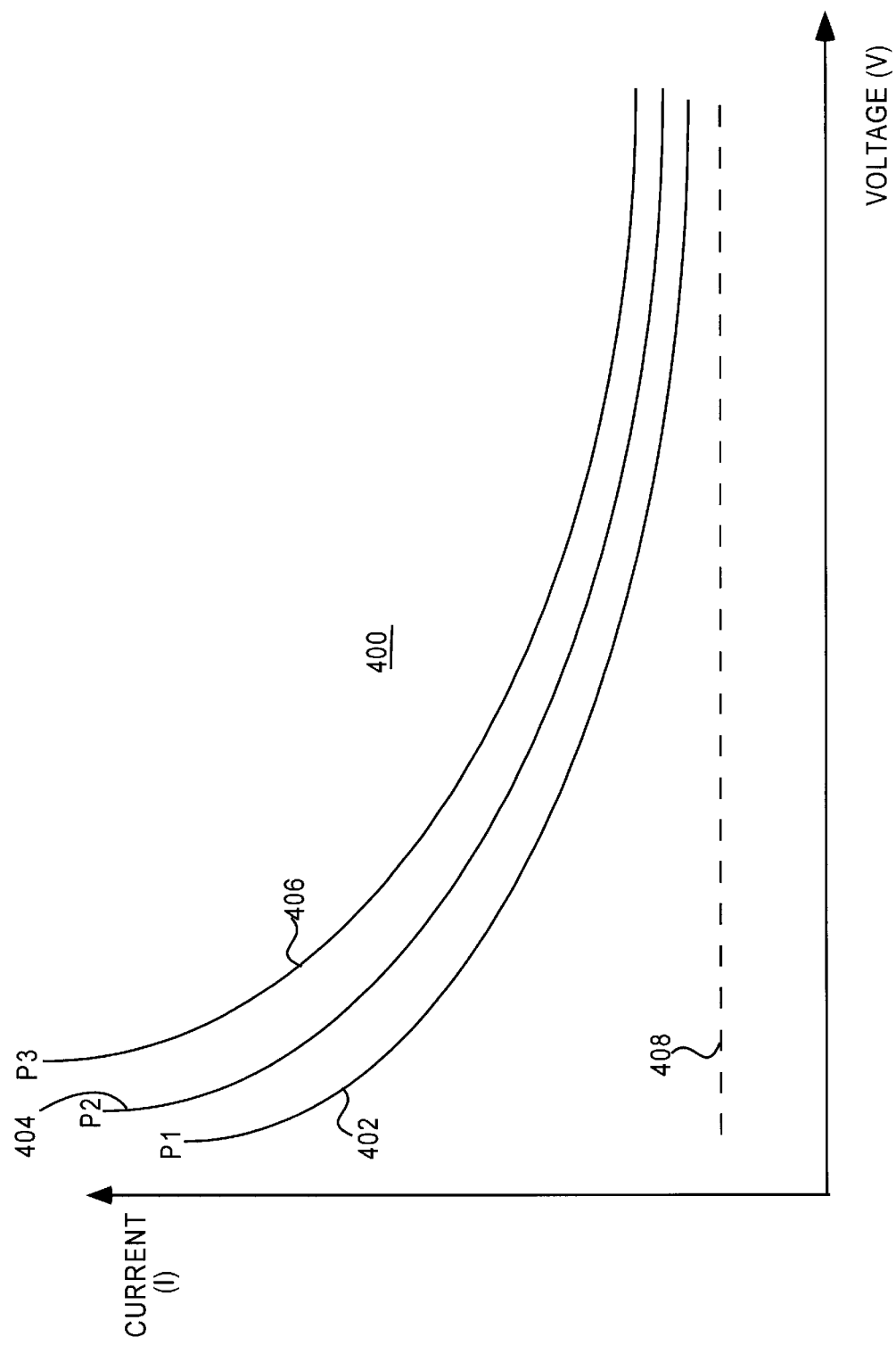
FIG. 4 is a graph of power curves illustrating exemplary operation of the invention.

FIG. 4 is a graph 400 of power curves 402, 404 and 406 illustrating exemplary operation of the invention. These power curves 402, 404 and 406 correspond to power curves P1, P2 and P3, respectively. As an example, the P1 curve can correspond to 5 Watts of power, the P2 curve can correspond to 110 Watts of power, and the P3 curve can correspond to 15 Watts of power. According to the invention, the power available for charging is dynamically determined such that the power curve having the highest power (as limited by availability) is effectively determined and utilized in charging the battery. Further, as described in detail in the related application, the charge current supplied to the battery can be made to vary in accordance with the battery voltage such that the power supplied to the battery follows an approximation of one of the power curves P1, P2 or P3. In contrast, the line 408 represents the power curve that would be conventionally used in charging a battery. Note that the power curve 408 is a horizontal line because the current is fixed at its worst case value. As can be seen from the exemplary illustration in FIG. 4, the power availability is dramatically improved through use of the invention.

Figure 5A:
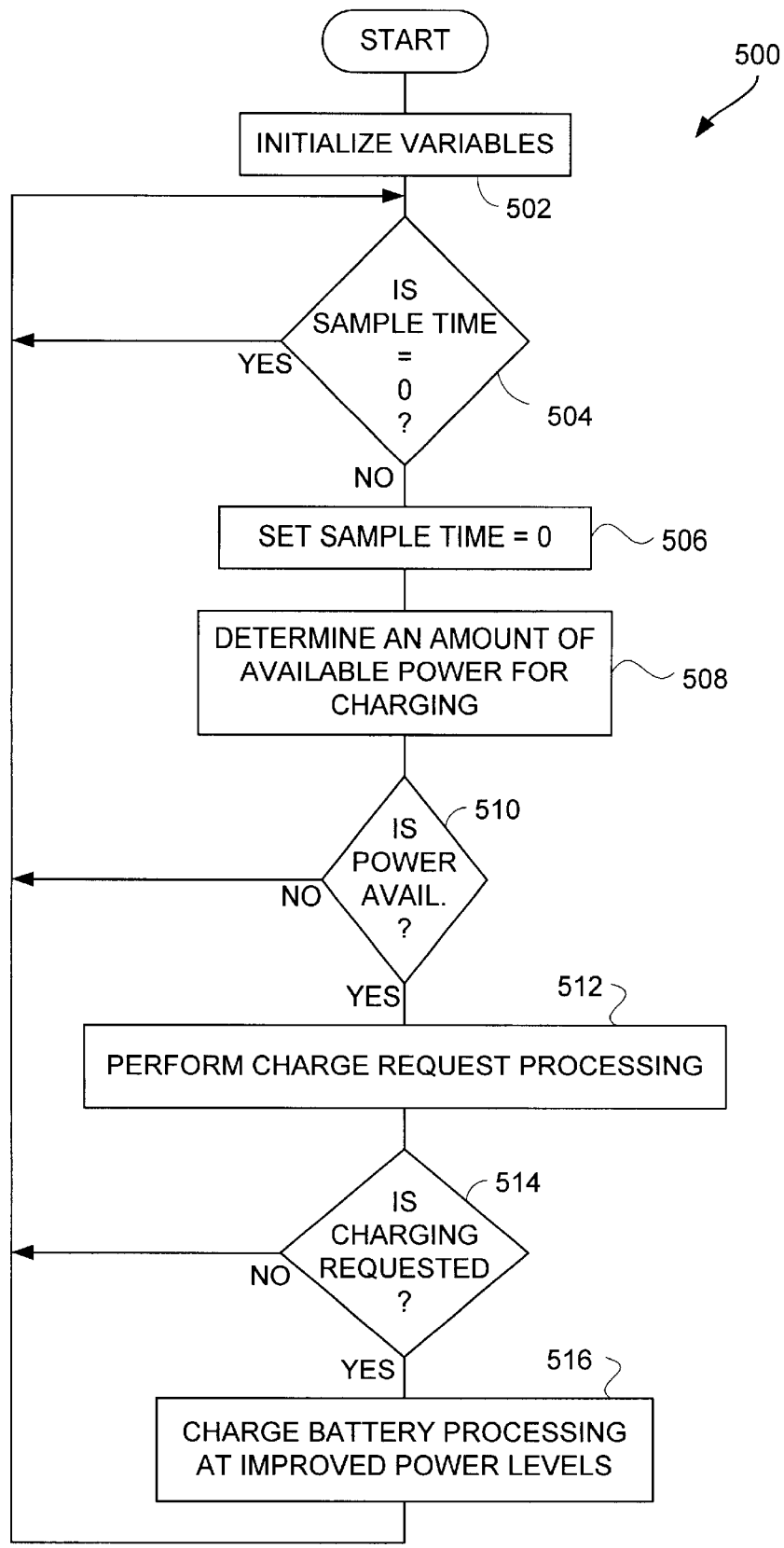
FIG. 5A is a flow diagram of battery charge processing according to another embodiment of the invention.

FIG. 5A is a flow diagram of battery charge processing 500 according to another embodiment of the invention. The battery charge processing 500 is used to charge a battery associated with a portable computing device. The battery charge processing 500 is, for example, performed by the portion 100 of the portable computing device illustrated in FIG. 1, namely, the power management microprocessor 106 and the battery charge circuit 108.

The battery charge processing 500 starts by initializing 502 variables. For example, a charge priority for the charge processing of a particular battery is set to zero (0). Should the portable computing device have a plurality of batteries, then the charge priorities can be used to select and then charge one of the batteries at a time. If the portable computing device only includes one battery, then the charge priority need not be provided.

Next, a decision block 504 determines whether the sample time equals zero (0). Here, the decision block 504 determines whether a predetermined time delay has elapsed since the battery charge processing 500 was previously executed. If the predetermined period of time has not yet passed, the decision block 504 causes the battery charge processing 500 to wait until it has elapsed. Once the sample time has elapsed since the last time the battery charge processing 500 was fully executed, the decision block 504 causes the battery charge processing 500 to continue.

When the battery charge processing 500 continues, the sample time is set 506 to zero (0). Here, the sample time flag is reset to zero (0) as it was previously set to one (1) after the predetermined period of time has elapsed by another mechanism. Then, an amount of power available for charging is determined 508. Again, a power supply that is responsible for generally supplying power to the portable computing device normally has a fixed amount of power sufficient not only for charging purposes but also for supplying power to the various active subsystems of the portable computing device. The determination 508 of the available power thus depends on the power being consumed by the various active subsystems of the portable computing device. Given that the components of a portable computing device are activated and deactivated often, the power available for charging changes frequently. Accordingly, the battery charge processing 500 operates to periodically (e.g., dynamically) determine the available power for charging so that effective use can be made of power that is not otherwise being consumed by the portable computing device.

Next, a decision block 510 determines whether there is power available for charging the battery. When the decision block 510 determines that there is no power available for charging the battery, then the battery charge processing 500 returns to repeat the decision block 504 and subsequent blocks because charging would in such a case not be permitted until there is power available for charging the battery. On the other hand, when the decision block 510 determines that there is power available for charging, then charge request processing is performed 512. The charge request processing is described in detail below with respect to FIG. 6.

After the charge request processing is performed 512, a decision block 514 determines if charging is requested. Here, normally the battery itself is intelligent enough to signal its request that charging is desired. Alternatively, other circuitry is able to monitor the battery to determine when charging is needed. When the decision block 514 determines that charging is not requested, then the battery charge processing 500 returns to the decision block 504 and subsequent blocks. On the other hand, when the decision block 514 determines that charging has been requested, then charge battery processing 516 is performed at improved power levels. The charge battery processing of block 516 is described below in greater detail with respect to FIG. 9. Following block 516, the battery charge processing 500 returns to repeat the decision block 504 and subsequent blocks. As a result, the battery charge processing 500 is able to periodically update the power level with which it charges the battery for improved charging.

Figure 5B:
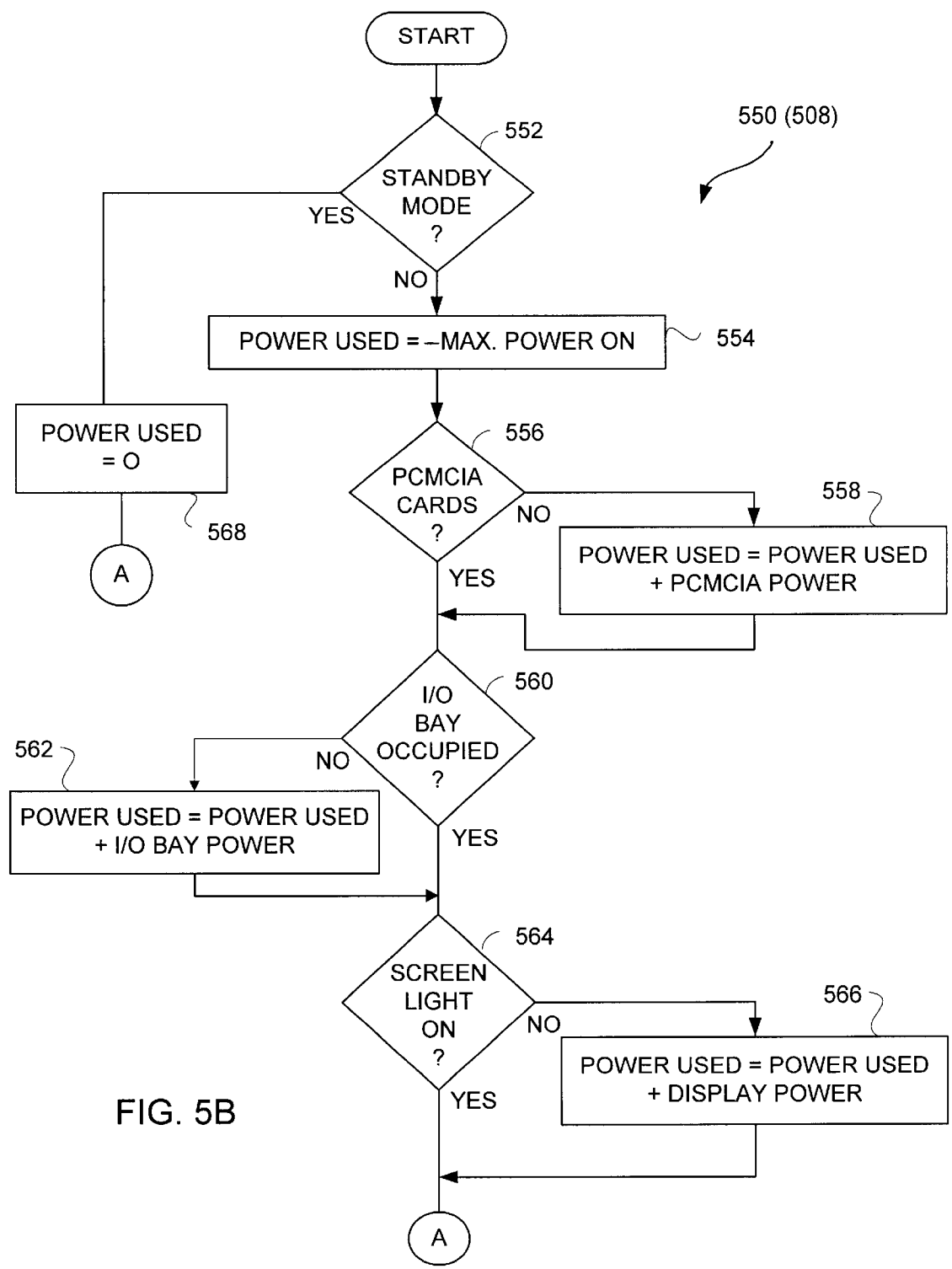
FIGS. 5B and 5C are flow diagrams of power availability processing according to another embodiment of the invention.
Figure 5C:
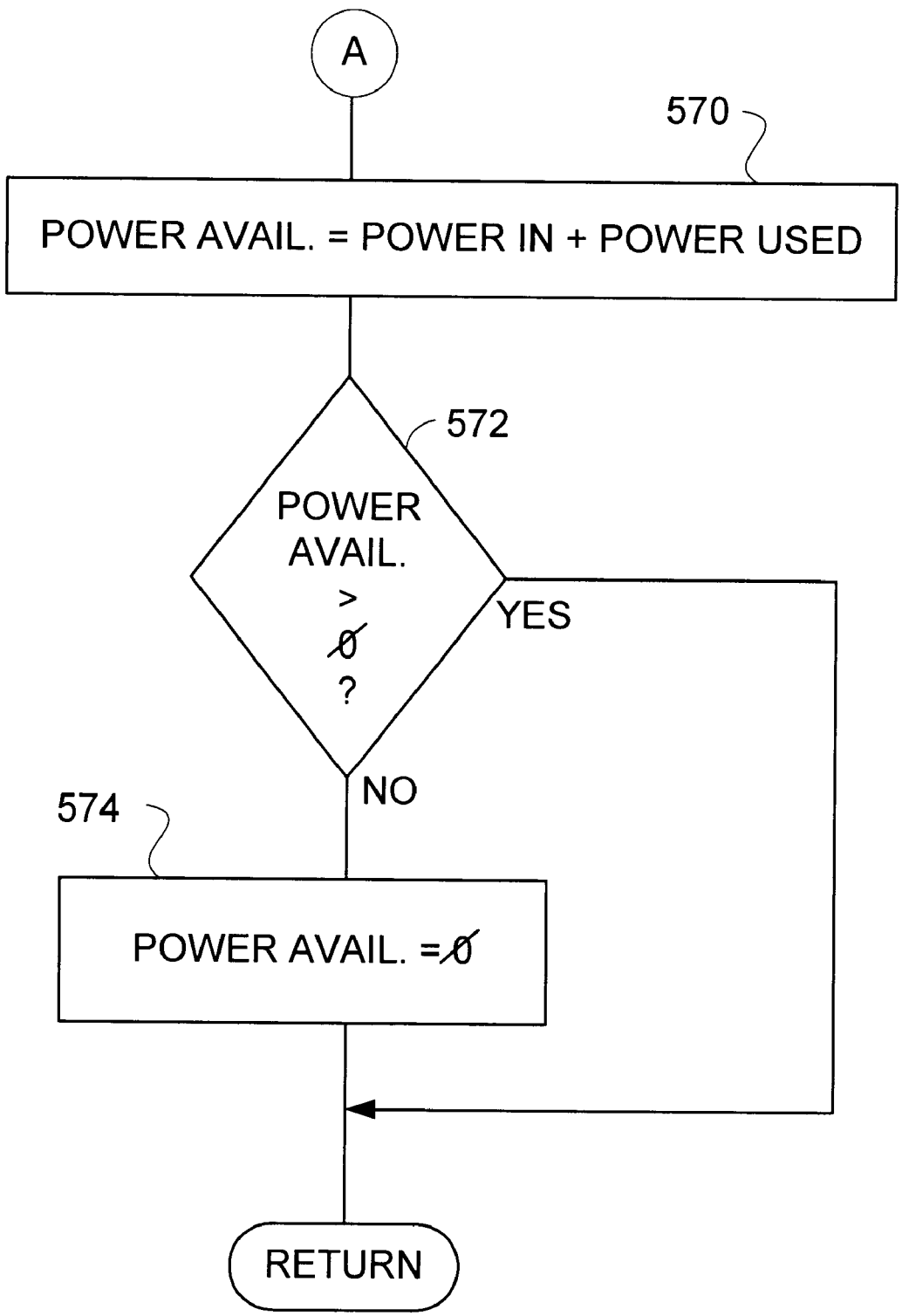

FIGS. 5B and 5C are flow diagrams of power availability processing 550 according to an embodiment of the invention. The power availability processing 550, for example, can be performed by block 508 illustrated in FIG. 5A.

The power availability processing 550 initially begins with a decision block 552. The decision block 552 determines whether the computing device is in a standby mode. When the computing device is not in a standby mode, the power availability processing 550 operates to determine the power available for charging. In block 554, the power used is initially set to a negative value associated with the maximum power used by the computing device in an active mode. Next, a decision block 556 determines whether the PCMCIA cards are present. Here, it is assumed that the computing device includes slots to receive PCMCIA cards, as well as an input/output (I/O) bay and a screen light (e.g., a back screen light). However, since the computing device can take a variety of different configurations, these subsystems of the computing device should be considered are representative examples. Such subsystems can be considered peripheral subsystems or peripheral components. When the decision block 556 determines that the PCMCIA cards are not present, then the power used is updated by adding 558 the PCMCIA power to the power used. The effect of block 558 is that the power used by the computing device is reduced. Alternatively, when the PCMCIA cards are determined to be present, the block 558 is bypassed.

Next, a decision block 560 determines whether an I/O bay is occupied by a device. When the decision block 560 determines that the I/O bay is not occupied, then the power used is reduced by an I/O bay power quantity which is associated with the specific power budget for the I/O bay. Alternatively, when the I/O bay is determined to be occupied, the block 562 is bypassed.

Next, a decision block 564 determines whether a screen light for the computing device is on. When the decision block 564 determines that the screen light is not on, then the power used by the computing device is adjusted 566 by the amount of power allocated to powering the screen light. On the other hand, when the decision block 564 determines that the screen light for the computing device is on, then the block 566 is bypassed.

Next, the power availability processing 550 proceeds to block 570. In addition, when the decision block 552 determines that the computing device is in the standby mode, the power availability processing 550 bypasses blocks 554–556 and instead performs block 568. In block 568, the power used is set to zero (0) because the computing device is in the standby mode. When the computing device is in the standby mode, it is assumed that the power consumed by the computing device is essentially zero (0). Following block 568, the power availability processing 550 also proceeds to block 570.

In block 570, the power available for charging is determined as the sum of the power in from a power source plus the power used. Notice that in this embodiment the power used will be a negative quantity and thus the power available for charging is always less than the power in from the power source. After having determined the power available for charging, a decision block 572 determines whether the power available is greater than zero (0). When the decision block 572 determines that the power available for charging is not greater than zero (0), then the power available is set to zero (0) in block 574. In this case, the power availability processing 550 limits the power available to non-negative values in case where the power available was determined in block 570 to be negative. On the other hand, when the decision block 572 determines that the power available for charging is greater than zero (0), then the block 574 is bypassed and the power available remains as a positive value. Following blocks 574 as well as following block 572 when the power available is greater than zero (0), the power availability processing 550 is complete and returns.

Consider a simplified example of the power availability processing 550. If the maximum power budget for the computing device is 50 Watts. In block 554, the power used is initially set to −50. Then, if the computing system at a present state in time does not include the PCMCIA cards, does have the I/O bay occupied, and does have the screen light on, then the power availability processing 550 will determine the power available for charging as follows. Assume that the power budgeted to the PCMCIA cards is 3 Watts, the power budgeted to the I/O bay is 5 Watts, and the power budgeted to the screen light is 6 Watts. Also assume that the maximum power available from the power supply is 60 Watts. Then, in such a condition, the power available for charging would be determined to be 19 Watts (60+(−50+3+6)). In contrast, for this same example, the conventional approach would yield only 10 Watts for charging.

The improved techniques according to the invention dynamically adjust the available power for charging so that the power devoted is maximized or increased, yet the system operation is not jeopardized. Further, additionally, at the increased power level, the techniques of the related U.S. Application referenced above which has been incorporated by reference can be used to maximize or increase the charge current used in charging the battery as the battery voltage changes in accordance with the maximized power level (e.g., power curve). In one embodiment, the invention used a look-up table stored in memory of the computing device to store the power curves (such as illustrated in FIG. 4) that the computing device is to follow. For example, once a power curve is determined based on the power that is determined to be available for charging, then the charge current can be looked up in the look-up table associated with the particular power curve for a given battery voltage. By doing so, the charge current is able to follow the highest power curve as the battery voltage changes. The dynamic adjustment of the available power for charging, in such an embodiment, means that the power curve (and preferably the charge current) in use can change dynamically. However, the invention primarily concerns the dynamic adjustment of the power available for charging and thus does not need to also change the charge current as the battery voltage changes during charging.

Figure 6:
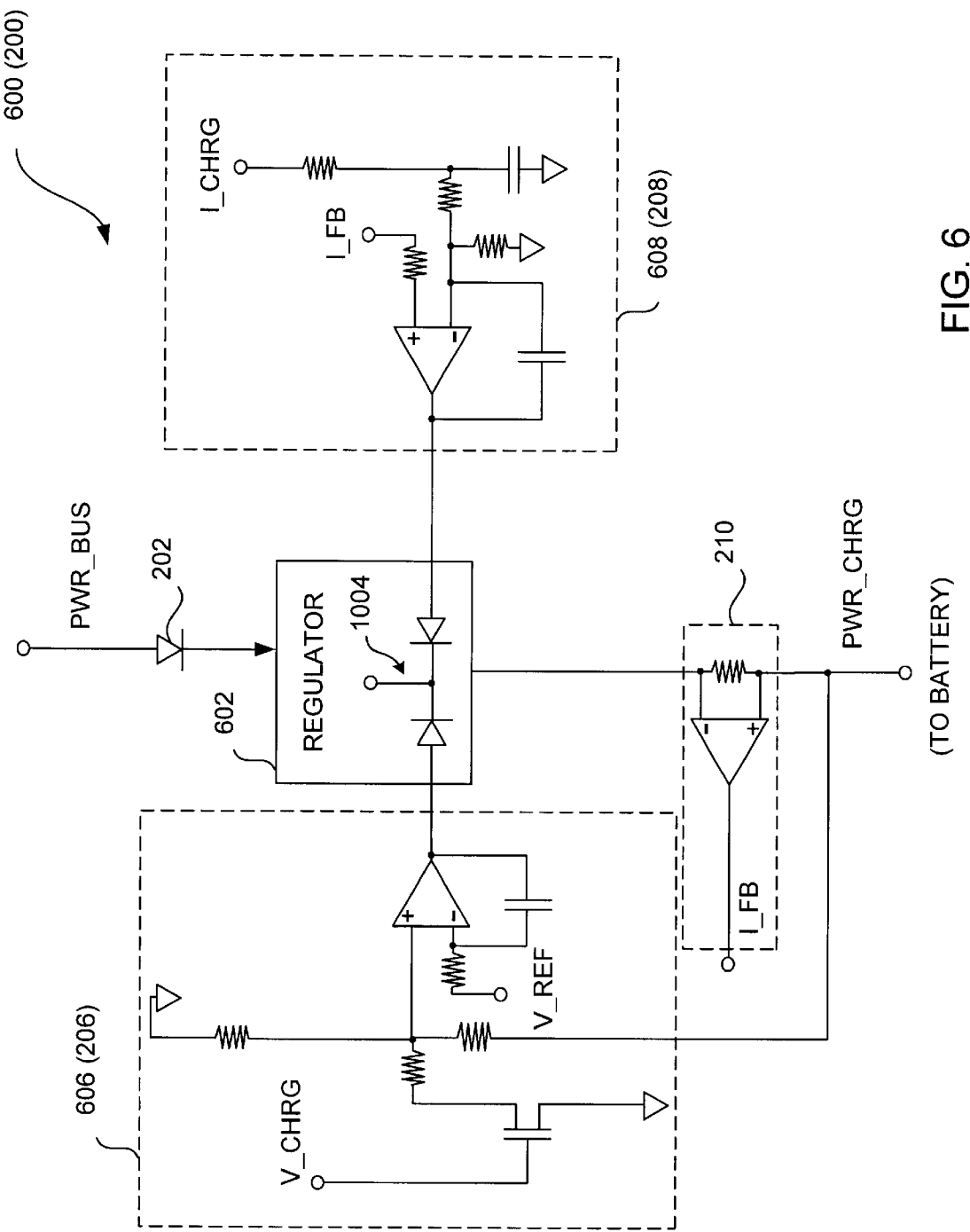
FIG. 6 illustrates a detailed diagram of a battery charge circuit that uses pulse-width modulation (PWM) signals for a charge voltage and a charge current.

Still further, in one embodiment, the charge voltage (V_CHRG) and the charge current (I_CHRG) supplied to the battery charge circuit 108 are pulse-width modulation (PWM) signals. Hence, the LUT could also store the efficient charge current ($I_{EFF}$) is a PWM fashion. Also facilitate comparison, the maximum charge current ($I_{MAX}$) could be represented in a PWM fashion. FIG. 6 illustrates a detailed diagram of a battery charge circuit 600 that uses PWM signals for the charge voltage (V_CHRG) and the charge current (I_CHRG). The battery charge circuit 600 is generally similar to the battery charge circuit 200 illustrated in FIG. 2. Specifically, the battery charge circuit 600 includes a regulator 602 that includes among other things a diode OR circuit 604. The battery charge circuit 600 also includes a voltage control circuit 606 and a current control circuit 608 that respectively supply inputs to the diode OR circuit 604. The diode OR circuit 604 causes the regulator 602 to supply the approximately constant power to the battery during charging. Given the construction of the voltage control circuit 606 and the current control circuit 608, these type circuits are referred to as servo amplifier circuits.

The advantages of the invention are numerous. One advantage of the invention is that a battery are able to be charged significantly faster than previously. Another advantage of the invention is that the charging of the battery is safely performed regardless of the amount of power being consumed by the operation of the portable computing device.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for charging a battery of a portable computing device from a power supply, comprising:
   (a) determining an amount of power available for charging the battery from the power supply depending on power being consumed by subsystems of the portable computing device;
   (b) determining power limits for charging the battery from the battery; and
   (c) charging the battery in accordance with both the determined amount of power and the power limits, such that the battery is charged with an increased amount of power from the power supply when one or more of the subsystems of the portable computing device are in a low power mode.

2. A method as recited in claim 1, wherein said determining (a) comprises:
   (a1) identifying an initial amount of power available for charging the battery from the power supply; and
   (a2) increasing the amount of power available for charging the battery from the initial amount to the increased amount of power when at least one of the subsystems of the portable computing device are in the low power mode.

3. A method as recited in claim 1, wherein the subsystems associated with one or more of a plug-in I/O slot device and a display screen.

4. A method as recited in claim 1, wherein when the determined amount of available power drops, the power used in said charging of the battery drops such that an amount of power being drawn from the power supply never exceeds the available power.

5. A method as recited in claim 1, wherein the portable computing device is a portable personal computer.

6. A method as recited in claim 1, wherein said charging operation (c) the battery is performed in accordance with both the determined amount of power and the power limits such that said charging operation (c) is performed in accordance with the lesser of the determined amount of power and the power limits.

7. A method for charging a battery of a portable computing device from a power supply. comprising:
   (a) receiving a charge request from the battery, the charge request identifying power limits for charging the battery;
   (b) determining an amount of power available for charging the battery from the power supply depending on power being consumed by subsystems of the portable computing device; and
   (c) charging the battery in accordance with the determined amount of power and the power limits such that the battery is charged with an increased amount of power from the power supply when one or more of the subsystems of the portable computing device are in a low power mode.

8. A method as recited in claim 7, wherein the portable computing device includes a plurality of batteries and receives a charge request from each of the batteries, and wherein said charging operation (c) comprises:
   (c1) determining a priority for each of the charge requests;
   (c2) selecting one of the batteries to be charged based on the charge priorities of the respective charge requests; and
   (c3) charging the selected one of the batteries in accordance with the lesser of the determined amount of power and the power limits.

9. A method as recited in claim 8, wherein said method further comprises:

(d) repeating operations (b)–(c) to cause the determined amount of power to be periodically adjusted in accordance with the power being consumed by subsystems of the portable computing device.

10. A method as recited in claim 1, wherein said method further comprises:

(d) repeating operations (a)–(c) to cause the determined amount of power to be periodically adjusted in accordance with the power being consumed by subsystems of the portable computing device.

11. A method as recited in claim 10, wherein the determined amount of power used in charging the battery is dynamically determined such that the power level used to charge the battery is substantially maximized for fast charging of the battery.

12. A method for charging a battery of a portable computing device, the portable computing device having peripheral subsystems, comprising:

(a) periodically monitoring a state of the peripheral subsystems, the state including an active state and an inactive state;

(b) periodically determining a power available amount for charging the battery based on the state of the peripheral subsystems;

(c) determining power limits for charging the battery from the battery;

(d) setting a power charge level for charging the battery based on the power limits and the power available amount, the power charge level being set to the lower one of the power limits and the power available amount; and (e) charging the battery in accordance with the power charge level.

13. A method as recited in claim 12, wherein the portable computing device is a portable personal computer.

14. A method as recited in claim 13, wherein said determining (c) of the power limits for charging the battery are provided with a charge request from the battery and wherein said method further comprises (f) determining a priority for the charge request so that multiple charge requests can be serviced by said method.

15. A computer system, comprising:

a power supply for providing DC power to said computer system from an AC power source;

a battery for providing DC power to said computer system;

a plurality of peripheral subsystems, each of the peripheral subsystems having a low-power state and an active state;

a processor for performing computations and controlling said computer system;

a power management unit for monitoring status of said battery, monitoring the state of said peripheral subsystems, and determining an amount of power available for charging based at least in part on those of said peripheral subsystems that are in the inactive state; and a battery charge circuit for delivering power from said power supply to said battery in accordance with the amount of power available for charging wherein said power management unit monitors of the status of said battery by monitoring a power limit for charging said battery and the amount of power available for charging is limited by the power limit.

16. A computer system as recited in claim 15, wherein said power management unit operates to increase a base amount of power available for charging said battery based on those of said peripheral subsystems that are in the inactive state when determining an amount of power available for charging.

17. A computer system as recited in claim 15, wherein said power management unit operates to determine the amount of power available for charging said battery based on a maximum amount of available power from said power supply after supplying power to said processor and those of said peripheral subsystems that are in the active state.

18. A computer system as recited in claim 15, wherein the amount of power available for charging is periodically re-determined by said power management unit.

19. A computer system as recited in claim 15, wherein said computer system is a hand-held portable computer system.

* * * * *

UNITED STATES PATENT AND TRADEMARK OFFICE
CERTIFICATE OF CORRECTION

PATENT NO. : 6,222,347 B1  
DATED : April 24, 2001  
INVENTOR(S) : Andrew Gong

Page 1 of 1

It is certified that error appears in the above-identified patent and that said Letters Patent is hereby corrected as shown below:

Column 3,
Line 61, "w ith" should be -- with --.

Column 4,
Line 19, "i00" should be -- 100 --.
Line 40, "t o" should be -- to --.
Line 66, "p owe r" should be -- power --.

Column 5,
Line 65, "infor ms" should be -- informs --.
Line 67, "th e" should be -- the --.

Column 8,
Line 22, "110 Watts" should be -- 10 Watts --.

Column 12,
Line 42, "supply." should be -- supply, --.

Signed and Sealed this

Fifth Day of March, 2002

Attest:

JAMES E. ROGAN
*Attesting Officer*     *Director of the United States Patent and Trademark Office*